(12) United States Patent  
Buldorini et al.

(10) Patent No.: US 10,667,309 B2  
(45) Date of Patent: May 26, 2020

(54) METHOD AND SYSTEM FOR ENABLING INTER-PLMN PROXIMITY SERVICES

(71) Applicant: TELECOM ITALIA S.p.A., Milan (IT)

(72) Inventors: Andrea Buldorini, Turin (IT); Giuseppe Catalano, Turin (IT); Maurizio Fodrini, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 15/751,200

(22) PCT Filed: Aug. 13, 2015

(86) PCT No.: PCT/EP2015/068658  
§ 371 (c)(1),  
(2) Date: Feb. 8, 2018

(87) PCT Pub. No.: WO2017/025145  
PCT Pub. Date: Feb. 16, 2017

(65) Prior Publication Data  
US 2018/0235019 A1 Aug. 16, 2018

(51) Int. Cl.  
*H04W 76/14* (2018.01)  
*H04W 4/021* (2018.01)  
(Continued)

(52) U.S. Cl.  
CPC ........... *H04W 76/14* (2018.02); *H04W 4/021* (2013.01); *H04W 48/16* (2013.01); *H04W 4/70* (2018.02); *H04W 88/06* (2013.01)

(58) Field of Classification Search  
None  
See application file for complete search history.

(56) References Cited

U.S. PATENT DOCUMENTS 9,565,608 B2 * 2/2017 Badic .................... H04W 76/14  
9,596,711 B2 * 3/2017 Kwon .................... H04L 12/18  
(Continued)

FOREIGN PATENT DOCUMENTS

WO 2014/102335 A1 7/2014  
WO 2015/053382 A1 4/2015

OTHER PUBLICATIONS

International Search Report and Written Opinion dated May 6, 2016 in PCT/EP2015/068658 filed Aug. 13, 2015.  
(Continued)

*Primary Examiner* — Ajit Patel  
(74) *Attorney, Agent, or Firm* — Oblon, McClelland, Maier & Neustadt, L.L.P.

(57) ABSTRACT

A method of enabling inter-mobile network proximity services through a direct link between mobile communication devices attached to different mobile networks, the method comprising: selecting and configuring at least one first mobile communication device attached to a first mobile network among said different mobile networks for the acquisition of configuration data related to proximity services of at least a second mobile network among said different mobile networks, said configuration data related to proximity services comprising information about radio resources assigned in said second mobile network for the proximity services; having the selected and configured first mobile communication device report the acquired configuration data related to proximity services of the at least a second mobile network to at least one between: the first mobile network, and at least one second mobile communication device located in proximity of the first mobile communication device.

14 Claims, 3 Drawing Sheets

(51) Int. Cl.
*H04W 4/70* (2018.01)
*H04W 48/16* (2009.01)
*H04W 88/06* (2009.01)

(56) References Cited

U.S. PATENT DOCUMENTS

| | | | | |
|---|---|---|---|---|
| 2014/0056220 A1* | 2/2014 | Poitau | ............... | H04W 76/14 |
| | | | | 370/328 |
| 2014/0243038 A1* | 8/2014 | Schmidt | ............... | H04W 4/90 |
| | | | | 455/552.1 |
| 2014/0335791 A1* | 11/2014 | Kim | ............... | H04W 4/023 |
| | | | | 455/41.2 |
| 2015/0127733 A1* | 5/2015 | Ding | ............... | H04W 4/08 |
| | | | | 709/204 |
| 2015/0139087 A1* | 5/2015 | Luft | ............... | H04W 52/0251 |
| | | | | 370/329 |
| 2015/0351076 A1 | 12/2015 | Pais et al. | | |
| 2016/0044737 A1* | 2/2016 | Kwon | ............... | H04W 76/14 |
| | | | | 370/328 |
| 2016/0205717 A1* | 7/2016 | Kazmi | ............... | H04W 8/005 |
| | | | | 455/435.2 |
| 2017/0303240 A1* | 10/2017 | Basu Mallick | ....... | H04W 72/04 |

OTHER PUBLICATIONS

Rainer Liebhart et al., "Proximity Services", LTE for Public Safety, Jul. 31, 2015, pp. 85-155, XP055238717.

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)",3$^{rd}$ Generation Partnership Project, 3GPP TS 36.300, V13-0-0, Jun. 2015, 254 total pages, XP050987580.

* cited by examiner

METHOD AND SYSTEM FOR ENABLING INTER-PLMN PROXIMITY SERVICES

BACKGROUND OF THE INVENTION

Technical Field

The present invention relates in general to the field of telecommunications and telecommunications networks, and particularly to mobile telecommunications networks like mobile (cellular) telephony networks and devices operable with the same (mobile devices). More specifically, the invention deals with the possibility to exploit functionalities through direct link among mobile communication devices (device-to-device functionalities).

Overview of the Related Art

Ordinary mobile services (i.e., services offered by mobile telephony networks, like voice calls, video calls, SMS, MMS) may involve mobile communication devices (in the following also referred to as "mobile devices", for brevity) belonging to subscribers of different Public Land Mobile Networks ("PLMNs"), associated with different mobile telecommunications network operators.

In order to set up inter-PLMN services (i.e., to enable the offer of services to subscribers of different PLMNs), it is usually needed to establish an interconnection path between the involved PLMNs for both signalling and communication.

The interworking between PLMNs of different operators is usually established through dedicated gateways located at the logical border of the respective PLMNs. The establishment of an interconnection path between different PLMNs is generally based on the mutual exchange of a limited number of parameters, like addresses of border gateways, registers of subscribers' information (e.g. the Home Location Register—HLR—in 2G/3G networks, which is the central database that contains details of each mobile device subscriber of a certain PLMN that is authorized to register to the PLMN), etc., so as to minimize the configuration effort and the amount of data to be exchanged between the PLMNs. These parameters are usually configured in a semi-permanent way, in order to minimize changes in time, which would require to the involved PLMNs additional configurations and testing.

The 3GPP (the acronym for the "3$^{rd}$ Generation Partnership Project") LTE (Long Term Evolution) Advanced (LTE-A) Release 12 suite of standards has introduced the technical functionalities needed to support proximity-based services (also referred to as "ProSe") based on a direct link between mobile devices (D2D, Device to Device) over a licensed frequency spectrum. Such functionalities enable the direct discovery (meaning that a mobile device can discover proximal mobile devices, which are broadcasting a short text message, usually an advertising message) and communication between mobile devices (establishment of a direct communication between proximal mobile devices). Proximal mobile devices are intended to be mobile devices which happen to be in a distance range spanning from a few meters to a few hundred of meters. Examples of commercial services potentially enabled by such functionalities are local advertising (e.g. a shop's advertising consisting of special offers to mobile devices passing by the shop) and public safety group calls (public safety officers having groups of calls in mission critical scenarios).

The 3GPP standardised solution for ProSe direct discovery (as set forth in the 3GPP Technical Specification—"TS"–23.303) assumes that a mobile device (also referred to as "User Equipment" or "UE" in the following) should announce its presence over a subset of available UpLink ("UL") radio resources used as a broadcast channel. Together with the presence information itself, a short text message is broadcast by the UE. All these pieces of information are coded according to rules defined in the 3GPP TS 23.303.

ProSe services require specific features on the mobile device side (radio capabilities to properly use the radio resources dedicated to ProSe, service capabilities to e.g. properly decode ProSe messages etc.), so as to make the mobile device able to transmit in direct mode (a mobile device having such features is also referred to as a "ProSe Capable UE"). Also, a service authorization is needed in order to run ProSe services: such authorization is usually stored in the subscriber profile of a mobile device user in the Home Subscriber Server ("HSS", a database of evolved mobile networks that, similarly to the HLR of 2G/3G networks, contains the subscription-related information (subscriber profiles), performs authentication and authorization of the user, and can provide information about the subscriber's location) and has the purpose of avoiding a non-controlled usage of D2D radio resources.

Due to their inherent characteristics, ProSe services cannot be limited to mobile devices served by a single PLMN, rather such services can envisage the interaction among mobile devices served by two or more, possibly several different PLMNs, of different operators.

The 3GPP has defined, starting from the Release 12 suite of its technical specifications (TS 23.303, TS 36.300, TS 36.331), a technological framework for ProSe services, which introduces, among many other features, network control on radio resources assignment, according to which UE shall use radio resources (in the following "ProSe related radio configuration data") authorized and configured by the E-UTRAN (Evolved Universal Terrestrial Radio Access Network) of the PLMN, both for announcing and listening.

In detail (as set forth in TS 36.331), in a multiple-PLMNs scenario, each mobile device attached to one PLMN, e.g. PLMN "A", can announce discovery messages only on its serving network cell by using the radio resources assigned by the PLMN "A" for this purpose (a subset of uplink radio resources of the network cell), and each mobile device registered on any different PLMN, e.g. PLMN "B", which is willing to listen to those discovery messages, shall listen on the radio resources assigned for such purpose by the PLMN "A".

As a consequence, a pre-requisite for the implementation of inter-PLMN ProSe services is that ProSe-interconnected PLMNs have to exchange information on the radio resources assigned to the ProSe services by each PLMN, by taking into account that said radio resources could vary frequently in time and space on the different PLMNs, due to different load, services and quality provided by each own operator. In order to minimize such an exchange of information, the current 3GPP solution (as specified in TS 36.331) establishes that UE attached to PLMN "B" have to listen to signalling broadcast channels of PLMN "A", in order to know in detail the exact radio resources assigned to the ProSe listening by PLMN "A". This requires that PLMN "B" provides its mobile devices with the information needed to find the signalling broadcast channels of PLMN "A".

In general, a radio serving node in a serving PLMN may provide through its broadcast signalling channel (e.g. in System Information Block—SIB—19 or in other relevant SIBs) a list of frequencies along with related PLMN identifiers (IDs), on which the UE may perform a search, in order to find those PLMNs' signalling broadcast channels on which ProSe-related radio configuration data are indicated.

Further, the 3GPP technical specifications (like for example TS 36.331) indicate that the above described procedure of obtaining ProSe-related radio configuration data by reading broadcast signalling channels of cells of other PLMNs shall not affect the reception capacity of the involved devices.

In cellular communication systems, radio resources are generally configured in a highly dynamic way, both in time and space, so that radio access is optimized for each cell on the basis of, for example, the actual load of the cell and/or the ongoing services. As a consequence, UE in Connected mode (i.e., UE with active data sessions ongoing) have to introduce long gaps in their transmission/reception activity in order to exploit such a procedure.

US 2014/242963A1 defines a network controlled algorithm able to manage the discovery process on the basis of the transmission by the network to the devices of proper configuration parameters, on the acquisition by the network of devices capabilities and, last, on the exchange of information between network nodes.

US 2015/0009910 defines an algorithm for radio resources assignment by the network to the devices that request them for ProSe services.

WO 2014/130156A1 defines an architecture and a mechanism for radio resources assignment for ProSe services. In detail, a network-controlled non-contentious mechanism and a device-controlled contentious mechanism are defined. Details of the two mechanisms (periodic transmission, characteristics of discovery packets, etc.) are defined.

SUMMARY OF THE INVENTION

The Applicant observes that US 2014/242963A1, US 2015/0009910, WO 2014/130156A1 are related to ProSe services and define mechanisms to implement discovery and/or communication between the devices and the network or between different network nodes. Device-to-network signalling can involve core network control entities (NAS—Non Access Stratum—signalling) or access control network entities (AS signalling). The common baseline is that all the disclosed mechanisms are related to an intra-PLMN scenario, where all the mobile devices belong to a same PLMN, that is, all the mobile device users are subscribers of the same PLMN, while, as said, ProSe services are expected to be carried out between devices belonging to multiple, different PLMNs. In other words, a ProSe service shall be feasible between a mobile device belonging to a PLMN "A" and a mobile device belonging to a different PLMN "B" and not only between devices all belonging to the same PLMN "A". Additionally, all the information provided by the mobile devices to the network in the above listed documents are related to mobile device capabilities and/or service features, but they are never related to configuration data of other PLMNs, in order to make the setup of the ProSe in an inter-PLMN scenario easy.

The Applicant has found that, in order to enable inter-mobile network (e.g., inter-PLMN) proximity services, a need exists to reduce the effort required to mobile devices for acquiring inter-mobile network (e.g., inter-PLMN) ProSe-related configuration data, particularly in order to make the mobile devices compliant with the requirement of not affecting their reception capacity for the other services, while allowing the involved mobile networks to dynamically update the ProSe-related configuration data as needed.

The solution proposed herein is focused on an inter-mobile network (e.g., inter-PLMN) scenario and, specifically, it aims at simplifying the exchange, between different mobile networks, of ProSe-related configuration data needed to mobile devices to avail of ProSe services, for example for, but not limited to, a direct discovery service, i.e., for the direct discovery of proximal mobile devices.

The solution disclosed herein removes the complexities related to the exchange of ProSe-related configuration data by introducing an enhancement in devices functionality.

In an embodiment of the solution disclosed herein, a method is defined to provide each mobile network (e.g., each PLMN) with ProSe-related radio configuration data associated to other mobile networks, by exploiting a self-provisioning mechanism involving the mobile devices and the mobile network and based on the mobile devices' acquisition and reporting capabilities typically available on such devices.

More specifically, in an embodiment of the solution disclosed herein, a limited number of mobile devices (a number of mobile devices which is substantially smaller than an overall number of mobile devices which are attached to a certain mobile network, possibly, at least one mobile device) of users which are subscribers of a certain mobile network (also referred to as the "home mobile network", e.g. "home PLMN" or "serving PLMN") acquire the radio configuration data assigned to ProSe services by another (at least one) mobile network, and report such ProSe-related radio configuration data to their serving mobile network. The serving mobile network then distributes to its own subscriber mobile devices involved in the ProSe the radio configuration data assigned to ProSe services by the other mobile network.

According to an aspect, a method is provided for enabling inter-mobile network proximity services through a direct link between mobile communication devices attached to different mobile networks, the method comprising:
selecting and configuring at least one first mobile communication device attached to a first mobile network among said different mobile networks for the acquisition of configuration data related to proximity services of at least a second mobile network among said different mobile networks, said configuration data related to proximity services comprising information about radio resources assigned in said second mobile network for the proximity services;
having the selected and configured first mobile communication device report the acquired configuration data related to proximity services of the at least a second mobile network to at least one between:
the first mobile network;
at least one second mobile communication device located in proximity of the first mobile communication device.

In an embodiment, said at least one first mobile communication device comprises a number of first mobile communication devices which are attached to the first mobile network which is substantially smaller than an overall number of mobile communication devices which are attached to the first mobile network, particularly from 1 to 5 first mobile communication devices per network cell which are attached to the first mobile network.

In an embodiment, said selecting is performed by the first mobile network.

Said selecting may be performed randomly among the mobile communication devices that are attached to the first mobile network.

In embodiments of the solution here proposed, said selecting may comprise selecting and configuring the at least one first mobile communication device among those mobile communication devices that are attached to the first mobile network and which have capabilities for proximity services through a direct link between mobile communication devices and have subscribed to proximity services.

In embodiments of the proposed solution, said selecting may comprise selecting and configuring the at least one first mobile communication device among those mobile communication devices that are attached to the first mobile network and for which one or more of the following conditions is valid:
- have a limited transmission burden, or
- have not already been selected, or
- report a radio link quality higher than a radio link quality threshold;
- are geographically closer to the second mobile network, or
- do not have ongoing data sessions.

The method may further comprise:
- in case the at least one first mobile communication device is in Connected Mode, having the first mobile network exploit information already available thereto for the selection of the first mobile communication device, wherein said already available information include a profile of the first mobile communication device and capabilities of the first mobile device;
- in case the at least one first mobile communication device is in Idle Mode, having the first mobile network broadcast a_Paging Message, said Paging Message including an indication for addressing mobile communication devices interested in the acquisition of configuration data related to proximity services; and having the at least one first mobile communication device answer to the Paging Message by establishing a Radio Resource Control, RRC and go into Connected Mode.

In embodiments of the present solution, said selecting may be a self-selection autonomously carried out by the mobile communication devices which are attached to the first mobile network.

Said self-selection may be based on capabilities of the mobile communication devices for proximity services through a direct link between mobile communication devices, and subscription of the mobile communication devices to proximity services.

In embodiments of the present solution, said having the selected first mobile communication device report the acquired configuration data related to proximity services of the at least a second mobile network to the first mobile network may comprise at least one between:
- having the first mobile network send a configuration message to the selected first mobile communication device via RRC signaling in order to request the UE to carry out a specified measurement, said configuration message containing information that are needed to the UE for carrying out the requested measurement for reporting acquired configuration data;
- having the selected first mobile communication device establish a dedicated data connection with the first mobile network.

In embodiments of the present solution, in the case the first mobile communication device reports the acquired configuration data related to proximity services of the at least a second mobile network to the first mobile network, the method further comprises:
- having the first mobile network indicate the configuration data related to proximity services of the at least a second mobile network to other mobile communication devices attached to the first mobile network.

In embodiments of the present solution, said having the selected first mobile communication device report the acquired configuration data related to proximity services of the at least a second mobile network to at least one second mobile communication device located in proximity of the first mobile communication device may comprise having the selected first mobile communication device exploit capabilities of direct link with the at least one second mobile communication device and transferring the acquired configuration data to the at least one second mobile communication device by means of a device-to-device, D2D channel.

The method may further comprise updating the configuration data related to proximity services of the at least a second mobile network available at the first mobile network, said updating being initiated by either the first mobile network or the first mobile communication device.

According to another aspect, a mobile network is proposed, the mobile network being configured to:
- select and configure at least one first mobile communication device attached thereto for the acquisition of configuration data related to proximity services of at least another mobile network, said configuration data related to proximity services of the at least another mobile network comprising information about radio resources assigned in said at least another mobile network for the proximity services;
- receive from the selected first mobile communication device a report of the acquired configuration data related to proximity services of the at least another mobile network.

The mobile network may be further configured to indicate, to other mobile communication devices attached thereto, the received configuration data related to proximity services of the at least another mobile network.

BRIEF DESCRIPTION OF THE DRAWINGS

These and other features and advantages of the solution disclosed herein will more clearly appear by the reading of the following detailed description of exemplary and non-limitative embodiments thereof, description that, for its better intelligibility, should be read in conjunction to the attached drawings, wherein.

DETAILED DESCRIPTION OF EXEMPLARY EMBODIMENTS OF THE PRESENT INVENTION

Figure 1:
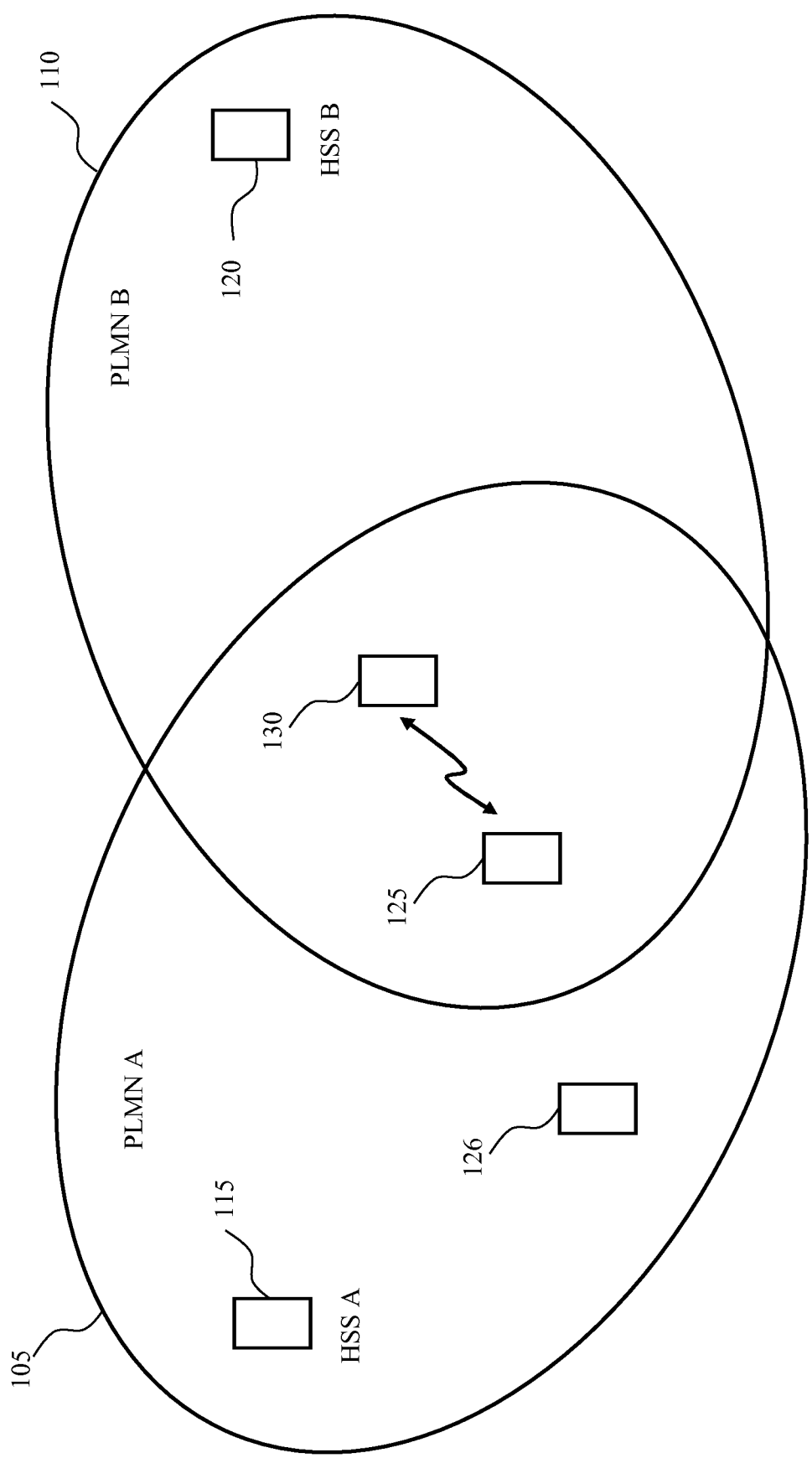
FIG. 1 depicts a scenario of inter-mobile network (e.g., inter-PLMN) ProSe services provision.

FIG. 1 depicts a scenario of inter-mobile network ProSe services provision.

Reference numerals 105 and 110 denote two different mobile networks, e.g. two different PLMNs, for example belonging to two different telecommunications network operators. The PLMNs 105 and 110 are for example $4^{th}$ generation ("4G") cellular networks, like 3GPP LTE-A cellular networks.

As known, a 3GPP LTE-A cellular network, like the PLMNs 105 and 110, comprises a radio access network (E-UTRAN) and a core network (Evolved Packet Core or EPC). The E-UTRAN comprises a plurality of transceiver nodes or stations, also known as eNodeB ("evolved NodeB"). An eNodeB provides radio coverage over a geographic area, divided into a configurable number of network cells (e.g., a typical configuration is three cells), for providing services (e.g., web browsing, e-mailing, voice calls, video calls, audio and/or video streaming) to mobile devices (User Equipment or UE, such as smartphones, tablets, phablets) within each network cell.

In FIG. 1, three UE are shown: two UE 125 and 126 attached to the PLMN A 105 and the other UE 130 attached to the PLMN B 110.

In the following, PLMNs involved in Inter-PLMN ProSe services are called "ProSe-interconnected PLMNs". Referring to FIG. 1, the PLMNs 105 and 110 are intended to be ProSe-interconnected PLMNs. An example of Inter-PLMN ProSe service is a direct discovery service, enabling different but geographically proximal UE (having suitable capabilities) to directly discover each other even if the different UE, like UE 125 and UE 130, are subscribers of different PLMNs, like PLMNs 105 and 110.

Also, in the following, by "subscriber's PLMN" it is intended the PLMN to which a UE is attached, i.e. the "serving PLMN" serving such UE. The subscriber's PLMN can for example be the home PLMN, i.e., the PLMN with which the owner of a UE has subscribed a commercial license for the delivering of services (including e.g. inter-PLMN ProSe services). A UE may happen to be attached to a PLMN different from the home PLMN, i.e., a "visited PLMN" in case of (national or international) roaming agreements between the home PLMN and a visited PLMN, e.g., when the coverage by the home PLMN is not available. Referring to FIG. 1, the PLMN 105 is the subscriber's PLMN for UEs 125 and 126 (because the UE 125 and 126 are assumed to be attached to the PLMN A 105), and the PLMN 130 is the subscriber's PLMN for UE 130 (because the UE 130 is assumed to be attached to the PLMN B 110). This implies that a subscriber's profile associated to the UE owners whose UE are attached to a PLMN is made available in a subscriber's PLMN by the HSS of the home PLMN, e.g. the HSS 115 for the PLMN A 105 and the HSS 120 for the PLMN B 110.

The following description refers to an exemplary ProSe service, this being the direct discovery service, but the described concepts can also be applied to any other ProSe service requiring a direct exchange of data among mobile devices across different PLMNs.

Figure 2:
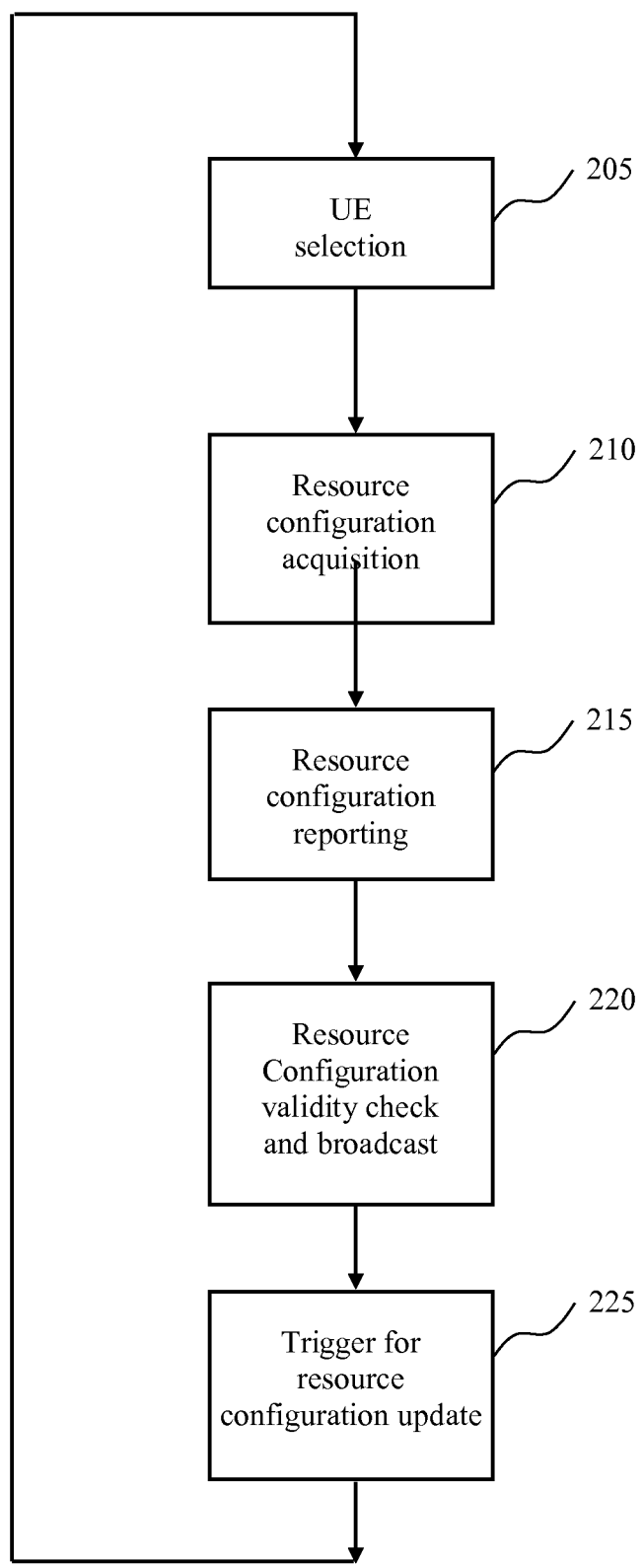
FIG. 2 is a simplified flowchart depicting the main steps of a method according to an embodiment.

Referring to FIG. 2, a method according to an embodiment of the solution disclosed herein comprises five main steps.

In a first step (step 1, block 205), or "UE selection" step, one UE or two or more UE which are attached to their subscriber's PLMN are selected and configured to acquire ProSe-related configuration data, comprising ProSe-interconnected PLMNs radio resources assigned in ProSe-interconnected PLMNs. Referring by way of example to FIG. 1, UE 125, being attached to its subscriber's PLMN 105, is selected to acquire ProSe-related configuration data of the PLMN B 110. The one, two or more UE selected and configured by, e.g., the PLMN A 105 to acquire ProSe-related configuration data can either be UE in respect of which the PLMN A 105 is the home PLMN, or UE for which the PLMN A 105 is a visited PLMN (i.e., UE which are attached in roaming to the PLMN A 105).

In a second step (step 2, block 210), or "Resource configuration acquisition" step, the (one or more) selected UE acquire the ProSe-related configuration data (comprising ProSe-interconnected PLMNs radio resources assigned in ProSe-interconnected PLMNs) according to any valid solution, e.g. current 3GPP solutions (for example as set forth in TS 36.331).

In a third step (step 3, block 215), or "Resource configuration reporting" step, the (one or more) selected UE report the acquired ProSe-related configuration data to their subscriber's PLMN. Referring by way of explanation to FIG. 1, assuming that UE 125 has been selected and configured by the PLMN A 105 to acquire ProSe-related configuration data, the UE 125 reports to its subscriber's PLMN A 105 the acquired ProSe-related configuration data of the ProSe-interconnected PLMN B 110.

In a fourth step (step 4, block 220), or "Resource configuration validity check and broadcast" step, the subscriber's PLMN indicates ProSe-related configuration data to other UE attached thereto, for example using a signaling broadcast channel (e.g., SIB 19), in order to make them available for interested ProSe-capable UE of such PLMN, e.g. UE 125 and 126 for the PLMN A 105. Alternatively, a possible different mechanism is that the subscriber's PLMN sends, e.g. via dedicated RRC signaling, ProSe-related configuration data only to ProSe-capable UE attached thereto, exploiting ProSe capabilities of the UE (as specified in the HSS of the PLMN). In addition or in alternative, as described in greater detail in the following, a UE that is attached to a PLMN and that has been selected and configured by such PLMN for the acquisition of ProSe-related configuration data, may directly provide the relevant information to other proximal UE interested in ProSe services (under the same or a different PLMN) by means of a D2D channel.

In a fifth step (step 5, block 225), or "Triggers for resource configuration update" step, in case the subscriber's PLMN, or the UE selected to acquire ProSe-related configuration data, realize that the information presently available thereto needs to be updated, the process restarts from step 1.

In the following, the above listed steps are described more in detail.

Step 1 (Block 205), "UE Selection"

In this step, the selection of the (one or more) UE deputed to the acquisition of the ProSe-related configuration data comprising ProSe allocated radio resources in a ProSe-interconnected PLMN is carried out.

The UE selection can be done according to two alternative mechanisms: a first mechanism is a network (PLMN) controlled UE selection mechanism, while a second mechanism is an autonomous UE selection mechanism.

Network Controlled UE Selection

According to this approach, the serving PLMN selects one or more of its served UEs for acquiring ProSe-related configuration data of ProSe-interconnected PLMNs according to the following principles:

1. Criteria for UE Selection

Since the acquisition, by a UE, of ProSE-related configuration data is based on a general capability (i.e., SIB reading capability) of the UE, in principle any UE is a suitable candidate for being selected. This gives a great flexibility of selection to the network. One possible criterion for the selection of the (one or more) UE is a random selection. Beyond the basic possibility to choose the UEs randomly, the following criteria can be applied:

a. Selection of UE which have subscribed to a ProSe service and have ProSe capabilities, so that only those UE which are actually interested in the ProSe service may be selected to perform the task of the acquisition of the ProSE-related configuration data. The knowledge of subscription data and UE capabilities data is normally available to the serving PLMN based on subscription profiles and UE capabilities: the profile of the generic UE is registered in the HSS of the PLMN, while the serving PLMN knows the UE capabilities at every connection establishment phase.

b. Selection of UEs can be further refined taking into account:
- traffic profile (e.g., UE used for machine-to-machine services which normally have a limited transmission activity are selected);
- past searches (e.g., UE which have already made a search are not selected);
- radio link quality higher than a radio link quality threshold;
- UE position (e.g., UE which are geographically closer to the cells of other PLMNs are selected);
- UE load (e.g., UE with ongoing data session are not selected).

The number of UE in a network cell to be selected is substantially smaller than an overall number of mobile communication devices in the network cell. The number of UE to be selected can vary from one to a few units, for example (but not limitatively) from one to five UE. The number of selected UE may depend on the traffic load, on the size of the network cell, on the type of service the UE are involved in. The higher the number of UE involved in the procedure, the higher the probability of success of the procedure and the lower the time to complete it. On the contrary, the processing burden for the eNodeB increases as the number of selected UE increases, to cross check all the received data.

2. Frequency of UE Selection

The selection of the (one or more) UE deputed to the acquisition of the ProSe-related configuration data is performed by the serving PLMN in order to acquire and update (when they change) the ProSe-related configuration data. The selection can be performed periodically, in a period of time suitable to keep the information updated (e.g., every day or in a different period based on experience), or the selection can be performed on an event-based fashion, that is, when a certain event occurs that indicates that the previously acquired Pro Se-related configuration data are no longer valid (this will be explained in greater detail below in connection with Step 5 of the method).

3. Procedures for UEs Selection

The following alternative approaches are possible.

a. Connected Mode UE

In this case the serving PLMN (e.g., the eNodeB of the serving PLMN) already has the information needed for the UE selection (UE profiles and capabilities) and can select the (one or more) UE deputed to the acquisition of the ProSe-related configuration data.

b. Idle Mode UE

To manage this scenario, some new mechanisms with respect to those envisaged in the current standards are needed:

i. the serving PLMN sends a new special "Paging Message" in its controlled cells using the ordinary Broadcast Paging Channel. Such a Paging Message shall include as special information a "ProSe Service" field, which has the purpose of addressing any UE interested in the acquisition of ProSe-related configuration data;

ii. the interested UE, in order to answer to such a Paging Message, should establish a new RRC (Radio Resource Control) connection with a new dedicated "Cause Value" (that is the usual indication why the UE is answering the paging) and go into Connected Mode. After that, the procedure is the same as for the Connected Mode case (item a. above).

Figure 3:
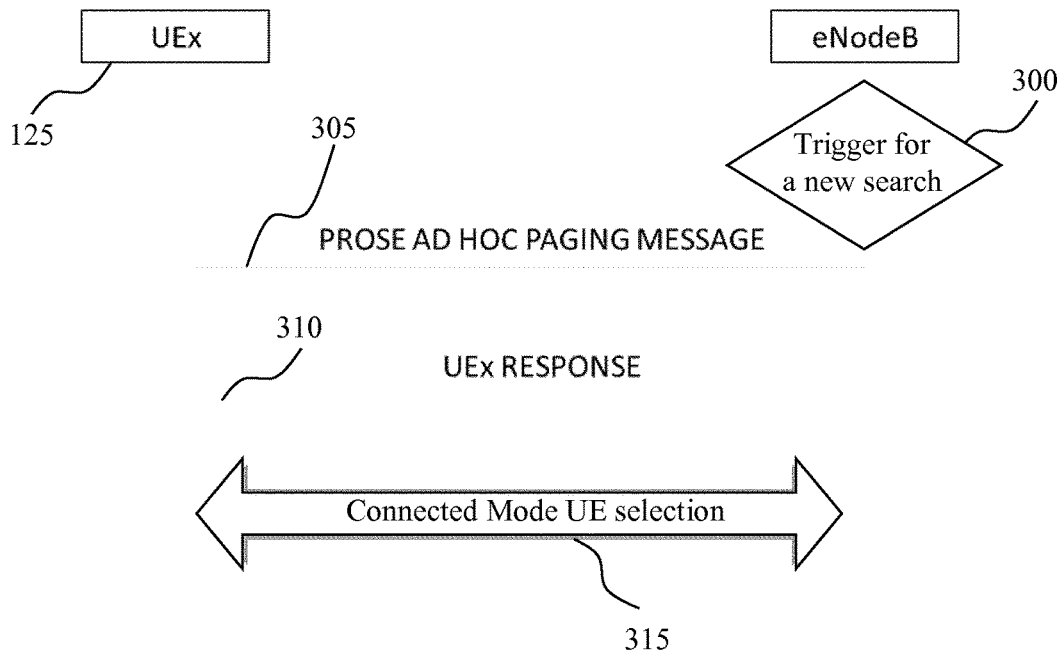
FIG. 3 schematically depicts an exemplary mechanism, according to an embodiment of the solution disclosed herein, for the selection of a UE devoted to the acquisition and reporting of ProSe-related configuration data, and FIG. 4 schematically depicts an exemplary mechanism, according to an embodiment of the solution disclosed herein, for the reporting by a UE of the acquired ProSe-related configuration data.

Such new mechanism is depicted in FIG. 3. When a PLMN, e.g. PLMN A 105, has to select UE for the acquisition of the ProSe-related configuration data (block 300), the new special Paging Message 305 is broadcast (by the eNodeB of that PLMN); the Paging Message 305 may include the indication that it is a Paging message generated for the purpose of Inter-PLMN Prose UE selection and configuration in order to collect candidate UE suitable for a successful search. Candidate UEs (UEx in FIG. 3, e.g. UE 125 in FIG. 1) answer (310) to the Paging message by establishing a new RRC (Radio Resource Control) connection with a new dedicated "Cause Value", in order to advise that they are establishing such connection so as to answer to an ad hoc ProSe Paging message. Additionally, the UE may provide information to help the selection of the most probably successful UE, in particular measurements of the requested Cell. In this way, UE which were previously in idle mode become Connected Mode UE, and the previously described approach under item a. for Connected Mode UE selection applies (315).

UE Autonomous Selection

In this case, differently from the network controlled UE selection, one or more UE perform a self-selection to acquire the ProSe-related configuration data without the need for any explicit request by the serving eNodeB of their own PLMN. As this method is not controlled by the network, either on an event-based fashion or on a periodical basis, it might result relatively inaccurate due to a limited or infrequent reporting by the self-selected UE. As a consequence, this approach should preferably require the involvement of a relatively high number of UE (higher than in the case of network-controlled UE selection) so as to make the asynchronous acquisition and reporting of information by the UEs more accurate and frequent.

As for the network controlled UE selection, criteria for UE self-selection may be based on, but not limited to, UE capabilities and user service profile as stored in the HSS of the PLMN, where UE capabilities may include an indication of D2D capabilities and user service profile may include information regarding subscription and authorization to ProSe services.

A relevant trigger for the autonomous, self-selection of UE can be that the currently available ProSe-related configuration data are no more valid. This implies that the UE interested to monitor ProSe resources on other PLMNs do not find any content related to ProSe services in the indicated radio resources, that is, the UE are unable to decode the content on that resources.

Step 2 (Block 210), Resource Configuration Acquisition

In this step, ProSe-related configuration data (radio resources information) of ProSe-interconnected PLMNs are acquired by the selected UE (selected in step 1) based on any conventional mechanism, like, e.g., 3GPP Release 12 mechanisms, as set forth in TS 36.331. More specifically, according to TS 36.331, a radio serving node in a serving PLMN may provide through its broadcast signaling channel (e.g. in SIB 19 or in other relevant SIBs) a list of frequencies along with related PLMN identifiers (IDs), on which the UE may perform a search, in order to find those PLMNs' signaling broadcast channels on which ProSe-related radio configuration data are indicated.

Step 3 (Block 215), Resource Configuration Reporting

Once a selected UE has acquired ProSe-related configuration data (radio resources information) of ProSe-interconnected PLMNs, the UE should report the acquired data to its serving PLMN and/or to other UE. This can be performed according to different approaches:

1. Reporting to the Serving PLMN:

a. Reporting Through RRC Signaling

The serving PLMN (i.e., the eNodeB of the serving PLMN) can send a configuration message to a UE via RRC signaling in order to request the UE to carry out a specific measurement. The configuration message contains all the information that are needed to the UE for carrying out the requested measurement. The configuration message may be based on one of the current 3GPP signalling messages (e.g. "Measurement configuration", "Logged measurement configuration" or "UE information request") extended with ProSe-related information described above, or a new RRC message dedicated for the purpose. The UE may provide the requested measurement immediately, upon the acquisition of the resource configuration data, or delay the provision of the requested measurement to a subsequent phase, e.g. when an RRC connection is not available because the UE is in idle mode, according to the received configuration.

b. Establishment of a Dedicated Data Connection

Figure 4:
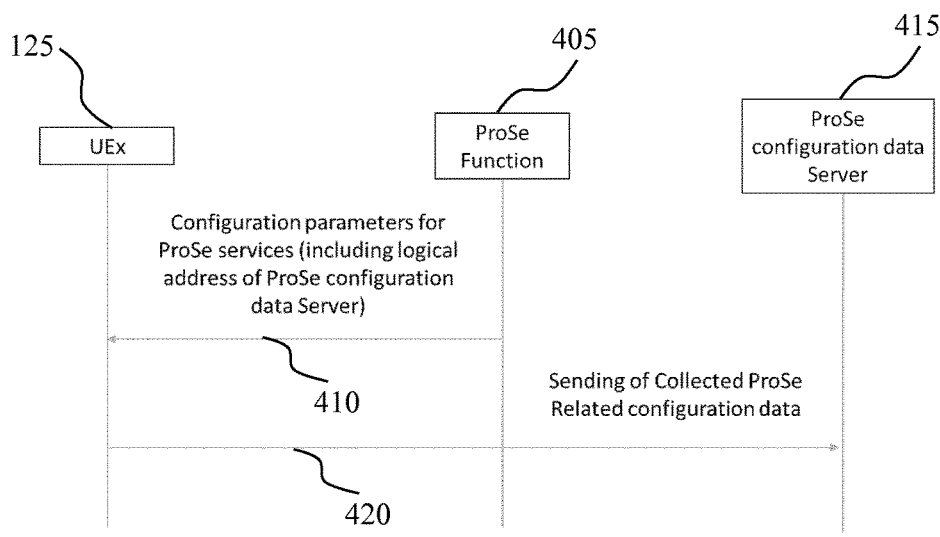

In this case, the UE selected for the acquisition of the ProSe-related configuration data establishes a dedicated data connection to report the acquired ProSe-related configuration data to a specific server in its serving PLMN. As schematized in FIG. 4, instead of relying on RRC signaling by the eNodeB, a ProSe Function 405 of the serving PLMN (i.e., a PLMN controller entity that manages the UE for the ProSe services) provides to the UE ProSe-related configuration parameters, for example according to mechanisms defined in the 3GPP TS 23.303. According to such mechanisms, the ProSe Function 405 sends (410) to the UE involved in ProSe services, via an IP connection, all the configuration parameters to run the ProSe services. Such configuration parameters include a logical address of a server (ProSe configuration data Server) 415 that is dedicated to collect reports from the UE. The logical address of the server 415 is configured in the UE. The UE can then report (420) the acquired ProSe-related configuration data. Address configuration can be sent to the UE together with all other ProSe related configuration parameters. This method is particularly suitable for the case of autonomous UE selection.

Once the serving PLMN has received by the UE the ProSe-related configuration data (radio resources information) of ProSe-interconnected PLMNs, the serving PLMN should check the validity of the received data.

In an embodiment, in order to establish the reliability of the received data, a threshold in terms of number of mobile devices which report the updated information to the serving PLMN is defined. Specifically, the received data will be considered updated only after a certain number of UE (e.g. 3, or 5, or more) have autonomously reported the same configuration data.

2. UE Direct Diffusion by ProSe Capabilities

In addition or in alternative to reporting the acquired ProSe-related configuration data to the serving PLMN, a UE can send the acquired ProSe-related configuration data directly to other interested devices using ProSe capabilities, that is a UE uses its D2D capabilities to transfer the acquired ProSe-related configuration data to other proximal UE interested in ProSe services (in the same or in different PLMN) by means of a D2D channel. In this case, an approach can be adopted by dedicating, according to existing D2D procedures, a ProSe code to the configuration data sharing.

In fact, the solution defined by the 3GPP for ProSe direct discovery (as set forth in TS 23.303) assumes that a UE should announce its presence over radio resources used as a broadcast channel. Together with the presence information itself, a short text information can be provided in order to enable services like e.g. advertising. All this information is coded according to rules defined in TS 23.303. In particular, a tree of codes is defined, where each branch is dedicated to a kind of services. According to an embodiment, a branch of codes is used for advertising ProSe-related configuration data. This approach has the advantage of saving signaling reporting from the UE to the serving PLMN and from the serving PLMN to other UE involved in the ProSe.

Step 4 (Block 220), Resource Configuration Broadcast

In case the UE direct diffusion of the acquired ProSe-related configuration data by ProSe capabilities is not exploited (or in addition thereto), the ProSe-related configuration data (radio resources information) of ProSe-interconnected PLMNs reported to the serving PLMN by their selected served UE can be sent by the serving PLMN by exploiting the existing 3GPP framework, i.e., using System Information Broadcast or dedicated RRC signaling to control D2D operations, with the currently standard information enriched with ProSe-related configuration data (radio resources information) of ProSe-interconnected PLMNs collected and reported by the selected UE. This could require either an extension of the current SIBs or a new dedicated SIB. Additional information to the ProSe-related configuration data may include, but are not limited to:

PLMN ID;
Cell ID;
Carrier frequency;
frequency sub-information (e.g. Physical Resource Blocks—PRB—in LTE) that are detailed resources pools assigned for ProSe monitoring in the ProSe-interconnected PLMNs;
validity timer (a validity timer can be representative of how the information provided is recent. This helps to trigger/not trigger an information update).

This mechanism can be used regardless of which reporting option is adopted in the previous step (e.g. 1.a.—"Reporting through RRC signaling"—and 1.b.—"Establishment of a dedicated data connection").

If the "Reporting through RRC signaling" is adopted, the configuration data acquired by the UE and collected by the eNodeB are processed by a Management function (e.g. an autonomic/Self-Organizing Network—SON—function) in the network, which configures, by means of a Configuration Management procedure in the eNodeB, the updated resource configuration to be broadcast to the UEs.

If the "Establishment of a dedicated data connection" is adopted, the information collected by the ProSe configuration data Server (415 in FIG. 4) can be processed by a Management function (e.g. an autonomic/SON function) in the network, which configures, by means of a Configuration Management procedure in the eNodeB, the updated resource configuration to be broadcast to the UE.

Step 5 (Block 225), Trigger for Resource Configuration Update

When a PLMN changes its ProSe-related radio configuration data, in the other ProSe-interconnected PLMNs the corresponding information results outdated. In this case, the UE served by the other PLMNs would not find ProSe-related radio configuration data associated to that PLMN on the indicated radio resources; in practice, the UE served by the other PLMNs would be unable to decode information on those resources.

In order to keep updated the information associated to ProSe-related radio configuration data in ProSe-interconnected PLMNs, several mechanisms are possible, for example:

Network-initiated periodic update: the PLMN periodically carries on the update procedure (the period of the update should be suitable to minimize the service disruption time);

UE-initiated update: when a UE realizes that the information available at its side is outdated, it informs the serving PLMN by sending a warning thereto. Based on this warning, the network carries on the update procedure. As in the resource configuration reporting (step 3 described above), the UE-initiated update procedure requires that the UE establishes a dedicated data connection having for example as a target the same ProSe configuration data Server 415 that collects the UEs reports (see step 3, 1.*b*. Establishment of a dedicated data connection).

Network-assisted UE autonomous scenario: it is based on a validity timer associated to ProSe-related configuration data; once the validity timer is expired, the UE may run autonomous acquisition of updated ProSe-related configuration data.

The solution described herein enables proximity services in an inter-mobile network scenario with a relatively limited effort required to mobile devices for acquiring inter-mobile network ProSe-related configuration data, particularly not to affect their reception capacity for the other services.

The solution herein described simplifies the exchange, between different mobile networks, of ProSe-related configuration data needed to mobile devices to avail of ProSe services, for example for, but not limited to, a direct discovery service, i.e. for the direct discovery of proximal mobile devices.

The invention claimed is:

1. A method of enabling inter-mobile network proximity services through a direct link between mobile communication devices attached to different mobile networks, the method comprising:

selecting and configuring at least one first mobile communication device attached to a first mobile network among said different mobile networks to acquire configuration data related to proximity services of at least a second mobile network among said different mobile networks, said configuration data related to proximity services comprising information about radio resources assigned in said second mobile network for the proximity services;

having the selected and configured first mobile communication device report the acquired configuration data related to proximity services of the at least a second mobile network via dedicated radio resource control (RRC) messaging with the first mobile network; and having the first mobile communication device indicate the configuration data related to proximity services of the at least a second mobile network directly to other mobile communication devices attached to the first mobile network.

2. The method of claim 1, wherein said at least one first mobile communication device comprises a number of first mobile communication devices which are attached to the first mobile network which is substantially smaller than an overall number of mobile communication devices which are attached to the first mobile network, particularly from 1 to 5 first mobile communication devices per network cell which are attached to the first mobile network.

3. The method of claim 1, wherein said selecting is performed by the first mobile network.

4. The method of claim 3, wherein said selecting is performed randomly among the mobile communication devices that are attached to the first mobile network.

5. The method of claim 3, wherein said selecting comprises selecting and configuring the at least one first mobile communication device among those mobile communication devices that are attached to the first mobile network and which have capabilities for proximity services through a direct link between mobile communication devices and have subscribed to proximity services.

6. The method of claim 3, wherein said selecting comprises selecting and configuring the at least one first mobile communication device among those mobile communication devices that are attached to the first mobile network and for which one or more of the following conditions is valid:

have a limited transmission burden, or have not already been selected, or report a radio link quality higher than a radio link quality threshold;

are geographically closer to the second mobile network, or do not have ongoing data sessions.

7. The method of claim 3, comprising:

in case the at least one first mobile communication device is in Connected Mode, having the first mobile network exploit information already available thereto for the selection of the first mobile communication device, wherein said already available information include a profile of the first mobile communication device and capabilities of the first mobile device;

in case the at least one first mobile communication device is in Idle Mode, having the first mobile network broadcast a Paging Message, said Paging Message including an indication for addressing mobile communication devices interested in the acquisition of configuration data related to proximity services; and having the at least one first mobile communication device answer to the Paging Message by establishing a Radio Resource Control, RRC and go into Connected Mode.

8. The method of claim 1, wherein said selecting is a self-selection autonomously carried out by the mobile communication devices which are attached to the first mobile network.

9. The method of claim 8, wherein said self-selection is based on capabilities of the mobile communication devices for proximity services through a direct link between mobile communication devices, and subscription of the mobile communication devices to proximity services.

10. The method of claim 1, wherein said having the selected first mobile communication device report the acquired configuration data related to proximity services of the at least a second mobile network to the first mobile network comprises:

having the first mobile network send a configuration message to the selected first mobile communication device via RRC signaling in order to request the first mobile communication device to carry out a specified measurement, said configuration message containing information that are needed by first communication device for carrying out the requested measurement for reporting acquired configuration data.

11. The method of claim 1, wherein said the selected first mobile communication device further reports the acquired configuration data related to proximity services of the at least a second mobile network to at least one second mobile communication device located in proximity of the first mobile communication device, the selected first mobile communication device exploiting capabilities of direct link with the at least one second mobile communication device and transferring the acquired configuration data to the at least one second mobile communication device by means of a device-to-device, D2D channel.

12. The method of claim 1, comprising updating the configuration data related to proximity services of the at least a second mobile network available at the first mobile network, said updating being initiated by either the first mobile network or the first mobile communication device.

13. A mobile network, comprising:
a plurality of mobile communication devices, wherein the mobile network is configured to:

select and configure at least one first mobile communication device of the plurality of mobile communication devices attached thereto for the acquisition of configuration data related to proximity services of at least another mobile network, said configuration data related to proximity services of the at least another mobile network comprising information about radio resources assigned in said at least another mobile network for the proximity services;

receive from the selected first mobile communication device and via dedicated radio resource control (RRC) messaging a report of the acquired configuration data related to proximity services of the at least another mobile network, wherein the first mobile communication device indicates the configuration data related to proximity services of the at least a second mobile network directly to other mobile communication devices attached to the first mobile network.

14. The mobile network of claim 13, further configured to indicate, to other mobile communication devices attached thereto, the received configuration data related to proximity services of the at least another mobile network.

* * * * *